No. 698,534. Patented Apr. 29, 1902.
L. A. MOREL.
PROCESS OF MANUFACTURING GLUTEN.
(Application filed June 16, 1900.)
(No Model.)
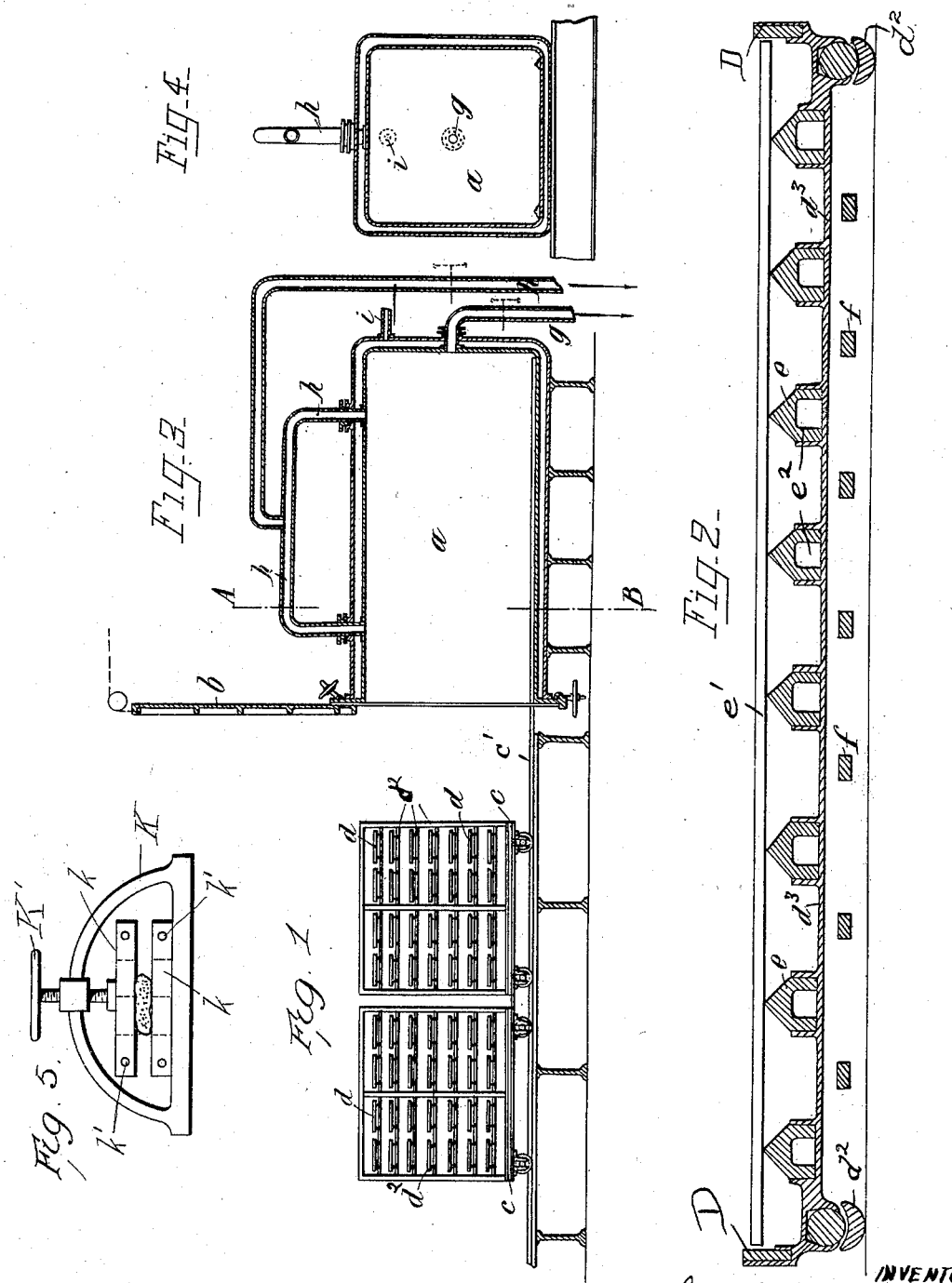
WITNESSES:
INVENTOR
Louis Alphonse Morel
ATTORNEYS
THE NORRIS PETERS CO., PHOTO-LITHO., WASHINGTON, D. C.

UNITED STATES PATENT OFFICE.

LOUIS ALPHONSE MOREL, OF PARIS, FRANCE.

PROCESS OF MANUFACTURING GLUTEN.

SPECIFICATION forming part of Letters Patent No. 698,534, dated April 29, 1902.

Application filed June 16, 1900. Serial No. 20,512. (No specimens.)

*To all whom it may concern:*

Be it known that I, LOUIS ALPHONSE MOREL, of 34 Boulevard Henri IV, in the city of Paris, Republic of France, have invented an Improved Process of Manufacturing Gluten, of which the following is a full, clear, and exact description.

My said invention relates to an improved process of treating gluten by cold after the starch has been separated from it, my object being to avoid any oxidation, fermentation, and alteration.

The invention consists in first freezing the gluten after it has been separated from the starch; second, subjecting such gluten to a pressing or rolling operation to form sheets or plates therewith and extract a part of the water thereof; thirdly, spreading such frozen gluten upon plates or hurdles, and, finally, subjecting such frozen gluten to a higher temperature in a vacuum apparatus to facilitate its expansion, to evaporate the moisture, and to dry the gluten.

I have illustrated an apparatus for carrying out the process in the accompanying drawings, in which—

Figure 1 is a side elevation showing trucks with platforms for carrying the plates of gluten to be dried. Fig. 2 is a sectional view of one of the platforms on a larger scale. Fig. 3 is a longitudinal section of a vacuum-chamber for receiving the plates or hurdles. Fig. 4 is a section on line A B of Fig. 3, and Fig. 5 is an elevation of a pressing device.

In the drawings, $a$ represents a jacketed chamber having a pipe $i$, communicating with a jacket for supplying heating fluid thereto, and suitable vacuum-pipes $g$ and $h$, as clearly shown in Figs. 3 and 4. The front of the chamber is open to receive shelf-trucks $c\ c$, carrying the gluten-plates, and after the trucks are within the chamber it is closed by a suitable door $b$. These trucks carry a plurality of removable shelves or hurdles $d$, each of which comprises a frame D and bottom $d^3$, supported upon bars $d^2$ and provided with transversely-arranged ribs or projections $e$, preferably of glass, which serve to support the frozen gluten, as indicated at $e$.

$f$ indicates bars extending beneath each shelf and designed to be heated when desired by electricity, the electric connections not being shown, as this forms no part of the present invention.

In Fig. 5 I have shown a press for compressing the gluten before its treatment in the vacuum apparatus. This comprises a frame K and plates $k$, having passages $k'$ for the passage of refrigerating medium, pressure being applied by a suitable hand-wheel and screw K'.

In carrying out the process the gluten after separation from the starch is frozen, pressed, and then spread out upon the plates $d$, which are loaded onto the trucks. These are then run into the vacuum-chamber, which is closed and the air therein exhausted by a vacuum of seventy to seventy-two kilograms. Upon the raising of the temperature by means of the jacket encircling the chamber, as well as by the electrically-heated bars $f$, located under the hurdles or plates, the gluten swells and attains the maximum of expansion. After complete evaporation of the water or moisture contained in the gluten there remains only dry gluten on the plates, which may then be powdered ready for the market.

Having thus described my invention, what I claim is—

The herein-described method of treating gluten consisting in first freezing the gluten, pressing and next spreading out the same upon supporting-plates, third, subjecting it in a vacuum to a freezing temperature, and finally raising the temperature to thaw the gluten and evaporate the moisture therefrom, substantially as described.

The foregoing specification of my improved process of manufacturing gluten signed by me this 2d day of June, 1900.

LOUIS ALPHONSE MOREL.

Witnesses:
EDWARD P. MACLEAN,
MAURICE W. PIGNET.